Figure 1:
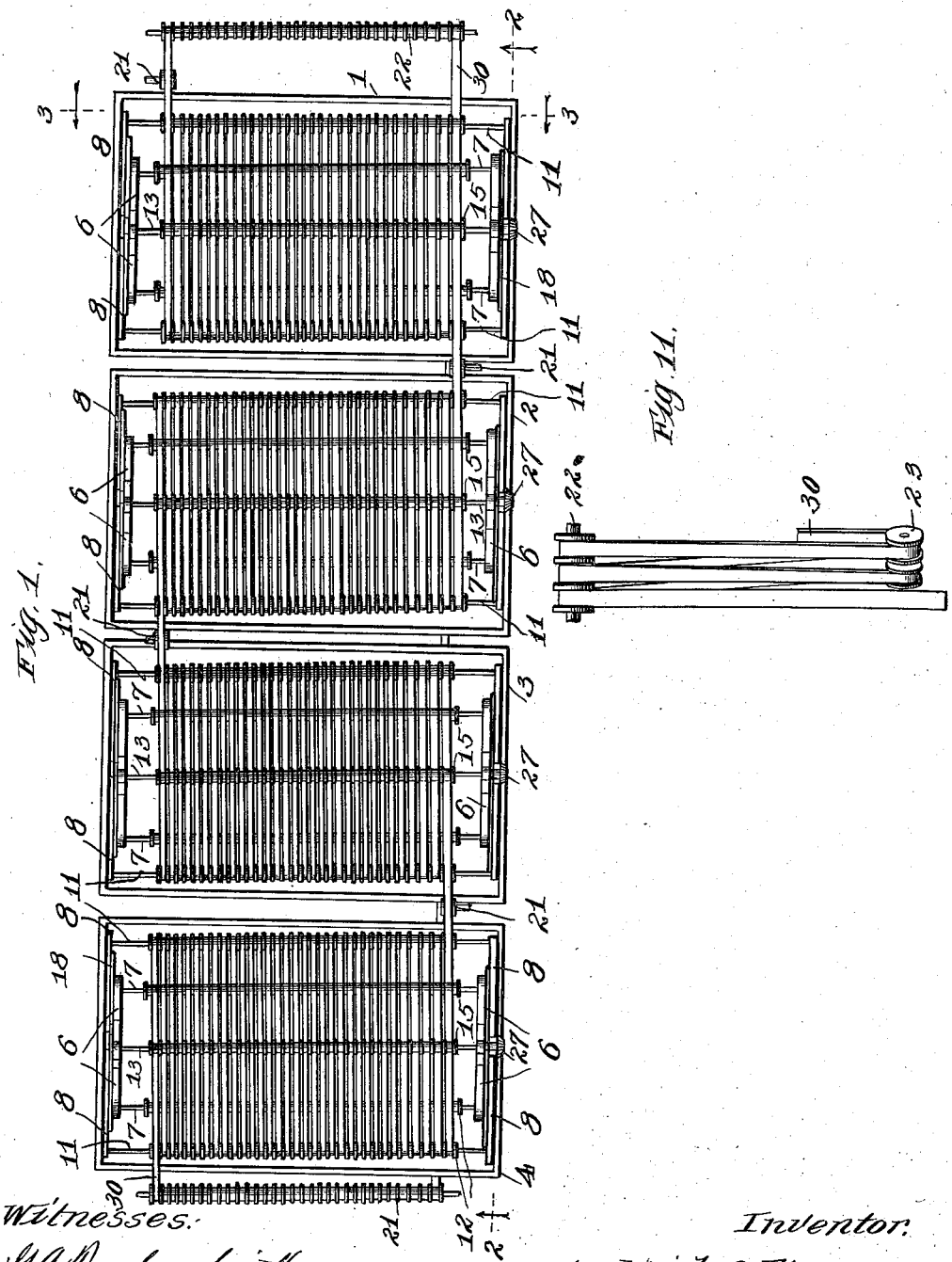
Figure 2:
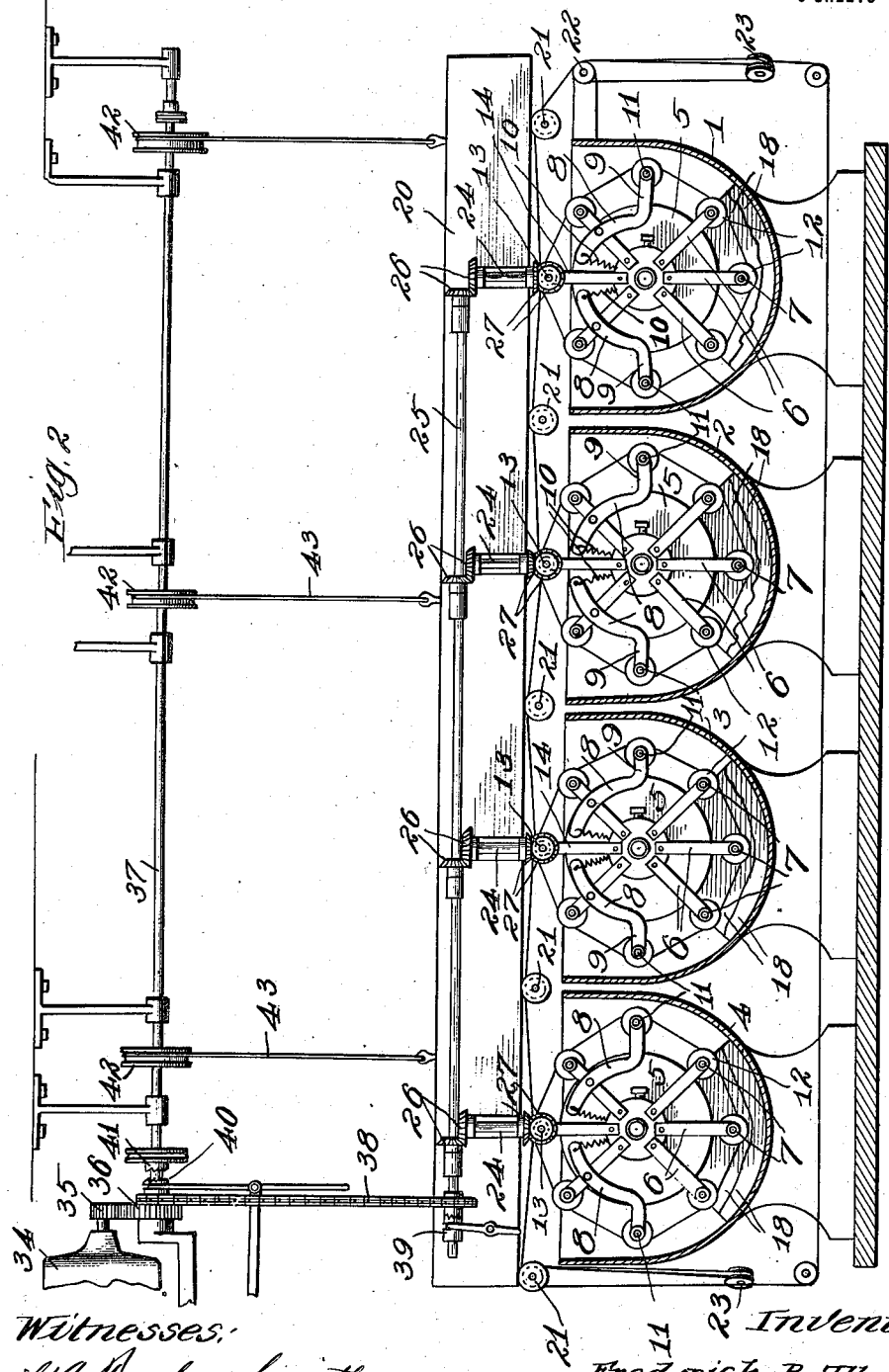
Figure 3:
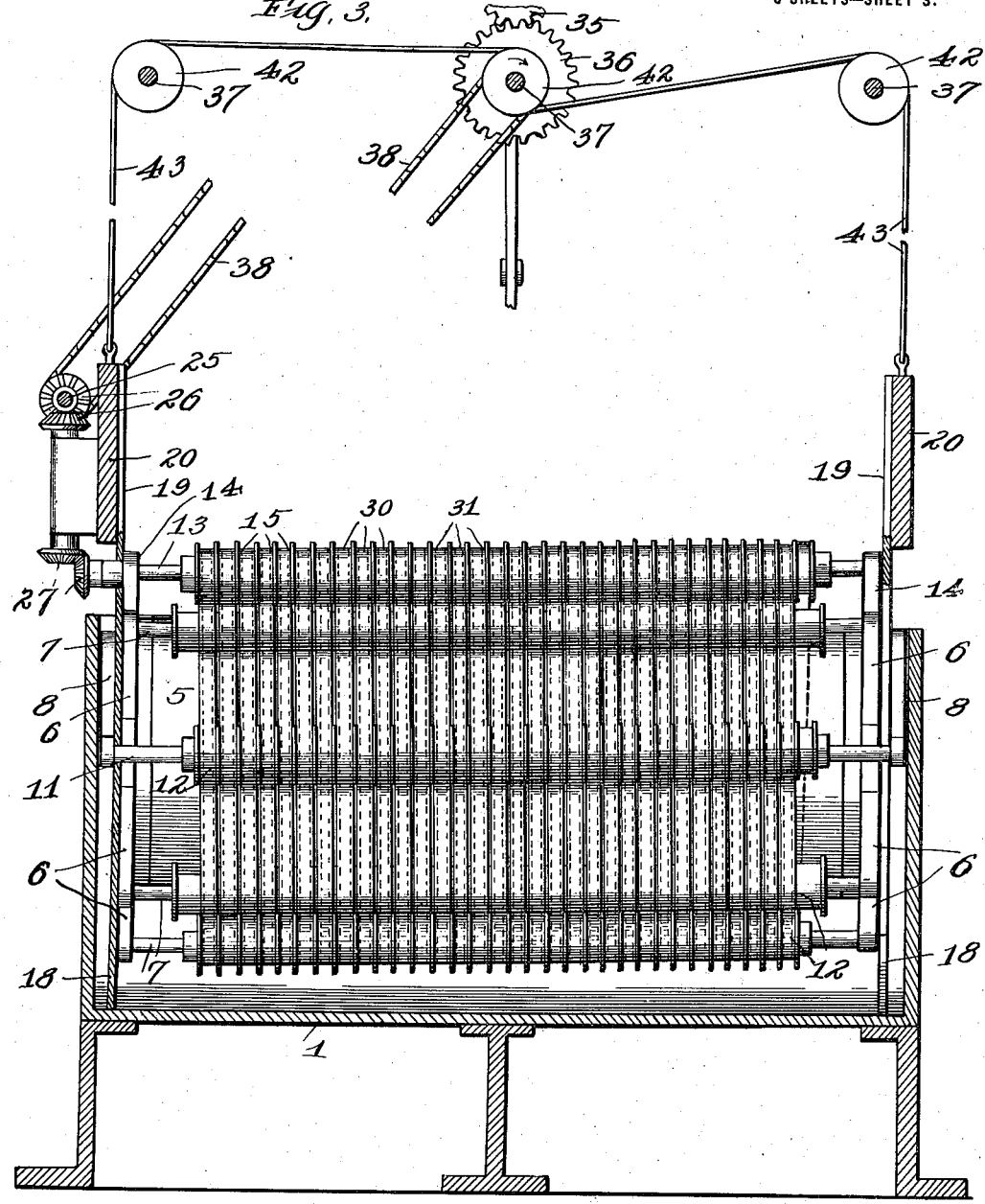
Figure 4:
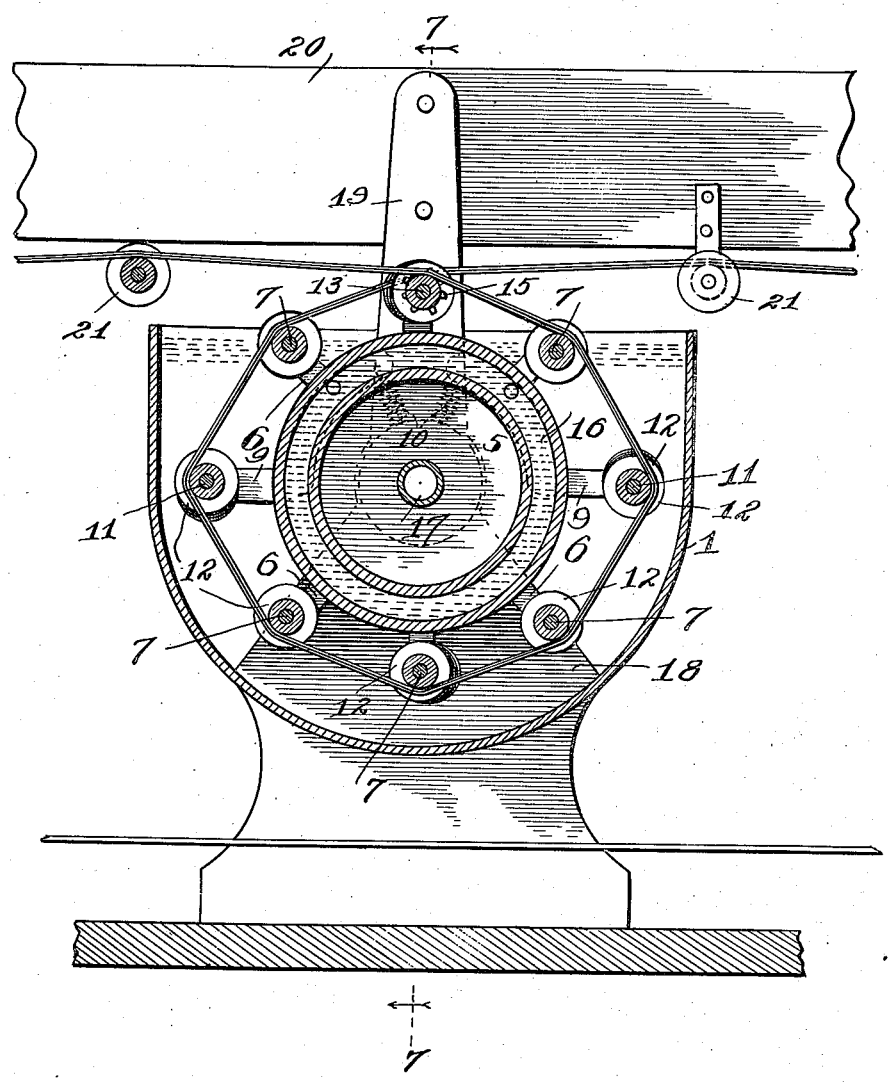
Figure 5:
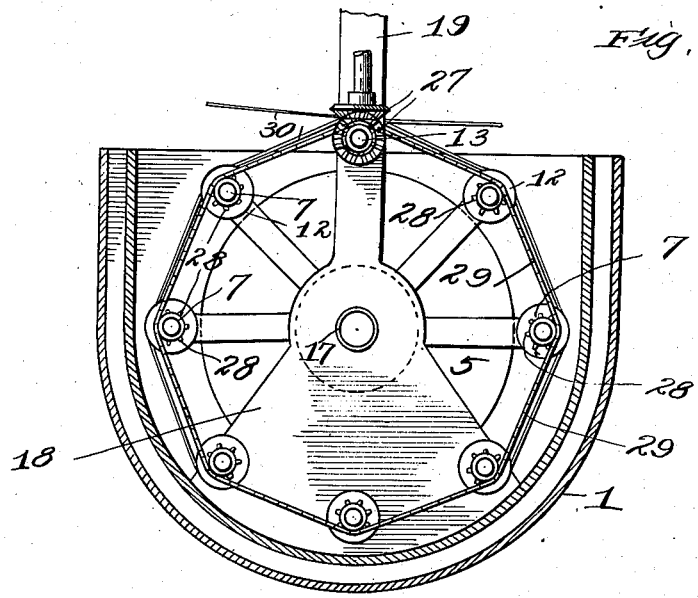
Figure 6:
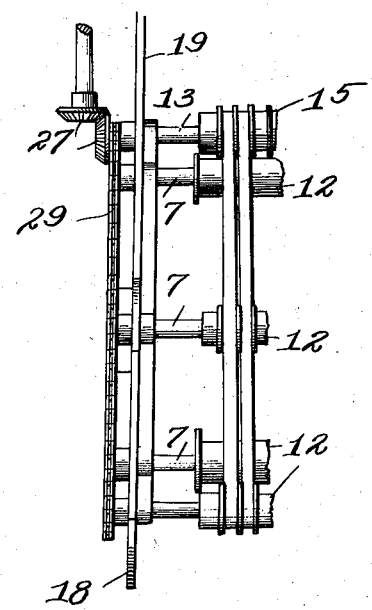
Figure 7:
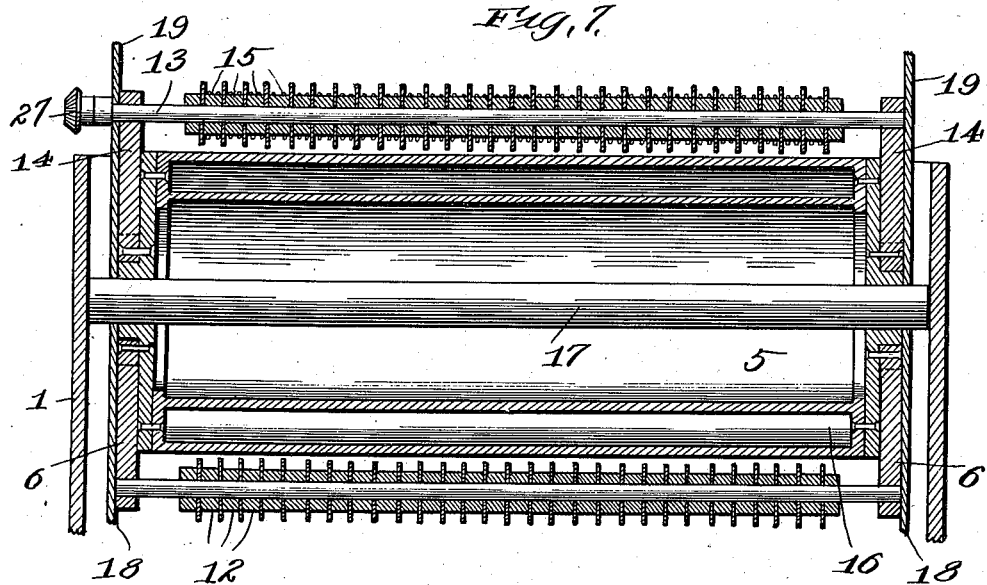
Figure 8:
Figure 9:
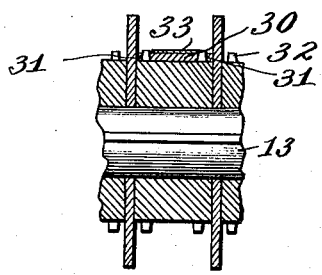
Figure 10:
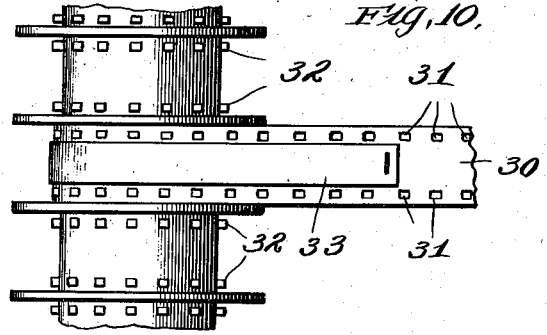

F. B. THOMPSON.
FILM TAPE TREATING APPARATUS.
APPLICATION FILED SEPT. 15, 1915.

1,244,258.

Patented Oct. 23, 1917.
6 SHEETS—SHEET 4.

Witnesses:

Inventor:
Fredrick B. Thompson

F. B. THOMPSON.
FILM TAPE TREATING APPARATUS.
APPLICATION FILED SEPT. 15, 1915.

1,244,258.

Patented Oct. 23, 1917.
6 SHEETS—SHEET 5.

Witnesses:

Inventor:
Fredrick B. Thompson
By Rudolph ... Atty

F. B. THOMPSON.
FILM TAPE TREATING APPARATUS.
APPLICATION FILED SEPT. 15, 1915.

1,244,258.

Patented Oct. 23, 1917.
6 SHEETS—SHEET 6.

Witnesses:

Inventor:
Fredrick B. Thompson,

UNITED STATES PATENT OFFICE.

FREDRICK B. THOMPSON, OF CHICAGO, ILLINOIS.

FILM-TAPE-TREATING APPARATUS.

1,244,258.   Specification of Letters Patent.   Patented Oct. 23, 1917.

Application filed September 15, 1915. Serial No. 50,865.

*To all whom it may concern:*

Be it known that I, FREDRICK B. THOMPSON, a citizen of the United States, residing at Chicago, in the county of Cook and State of Illinois, have invented certain new and useful Improvements in Film-Tape-Treating Apparatus; and I do hereby declare the following to be a full, clear, and exact description of the invention, such as will enable others skilled in the art to which it appertains to make and use the same.

This invention relates to improvements in apparatus for treating film tape of the character which is generally employed for taking and projecting motion pictures, and has for its object to provide an apparatus of the character defined in which the film tape passes continuously successively through a plurality of containers for liquids such as are used for developing, fixing and washing the film tape, and which is preferably associated with a suitable apparatus for drying the film and to which said film is fed as it leaves the solutions aforesaid.

The main object of the present invention is to provide mechanism for passing film tape through solutions for developing, fixing and washing the same which is so constructed and arranged as to cause the said film tape to travel in a generally or substantially circular helical path in which the straight runs between contiguous rolls over which the same or its carrier is trained are very short, thereby preventing lateral movement of the film tape relatively to its carrier or the rolls over which the latter is trained thus preventing injury to the film tape and interruption in the travel thereof due to lateral movement of the film tape which might result in its becoming trained over flanges separating contiguous rolls from each other.

A further object of the present invention is to provide an apparatus of the character defined in which the film tape is so exposed to view at intervals during travel as to enable the operator to carefully watch the same for the purpose of controlling the speed of travel thereof and thus the time of its subjection to the action of the liquids, and particularly the developing liquid, so as to prevent over or under exposure of the film tape.

A further object of the invention is to provide an apparatus of the character defined in which the containers for liquid through which the film tape passes are constructed and arranged to contain the minimum quantity of such liquids in order that the cost of renewing the baths from time to time may be decreased and such baths maintained always as fresh as possible.

A further object of the invention is to provide apparatus of this character in which all the film tape carrying mechanism is readily removable from the tanks containing the liquids at any time.

Other objects of the invention will be understood from the following specification.

In the accompanying drawings illustrating the preferred embodiment of my invention:

Figure—1—is a top plan view of film treating apparatus constructed in accordance with the invention, the mechanism for removing the film-tape carrying portion of the device from the containers for the liquids being omitted from illustration.

Fig.—2—is a vertical longitudinal section on the line 2—2 of Fig.—1—and includes the hoisting mechanism for the film-carrying and propelling mechanism.

Fig.—3—is a central vertical transverse section on the line 3—3 of Fig.—2—.

Fig.—4—is a detail vertical section through one of the containers for liquid.

Fig.—5—is a view similar to Fig.—4— showing a slight variation in the embodiment of the invention.

Fig.—6—is a fragmentary detail view in side elevation of the film-carrying and propelling mechanism.

Fig.—7—is a fragmentary vertical section on the line 7—7 of Fig.—4—.

Fig.—8—is a detail view in elevation of an idle roll employed.

Fig.—9—is a fragmentary detail longitudinal section through one of the film tape carrier propelling shafts employed.

Fig.—10—is a fragmentary detail plan view thereof.

Fig.—11—is a fragmentary detail view of a tension device employed for maintaining the film tape carrier under tension and in engagement with the propelling sprockets therefor.

In the treatment of photographic film tape the main thing to be watched and controlled is the time of its subjection to the action of the developing liquid employed so that the same may not be over or under developed. This requires very careful observation and control and by reason of the great length of said tape which is at the same time subjected to the action of the developing liquid and the difficulty in effecting rapid changes in the strength of the developing liquid employed, it will be apparent that the degree of development is not easily controlled. It has, therefore, been customary to cut the film tape into relatively short lengths which are, after treatment, spliced together. This is objectionable for many reasons in that it involves additional labor, weakens the tape, and necessitates blurring or cutting out two or more pictures at each splice, and also frequently results in variations in depth of development of the several spliced sections.

To handle very long lengths of film tape has, however, been found to be attended with so many difficulties that the foregoing cutting and splicing method has been found preferable because it involved less spoilage and loss.

The difficulties attendant upon handling long lengths of film-tape are very pronounced and in apparatus which I have heretofore invented and which are fully described and claimed in my co-pending applications Serial Numbers 876030, 45845 and 45846 I have found that these difficulties are not entirely overcome due mainly to the tendency of the film tape to make torsional movements in travel through the liquids, and the impossibility of controlling the tension or slack in such film tape at all points in its travel. In the several apparatus described and claimed in the aforesaid applications, there are comparatively long lengths of film tape disposed between successive upper and lower rolls and these long lengths have been found responsible for difficulties encountered.

The apparatus of my present invention comprises a plurality of tanks or vats 1, 2, 3 and 4, the number and relative arrangement of which may, of course, be changed and varied as desired. Each of said tanks or vats is provided with a substantially semi-cylindrical bottom, and is adapted to receive a hollow drum 5 to which is secured a plurality of radially disposed arms 6, each of which is equipped at its outer end with a bearing for a shaft 7 extending substantially axially parallel with said drum and in as close proximity as possible to the circumferential face thereof. Pivotally mounted upon the ends of the drum 5 are two substantially L-shaped arms or levers 8, each having one arm 9 arranged to project substantially radially from the axis of the drum, and the other arm of which is pivotally secured between its ends to one of the arms 6 carrying a bearing for the shaft 7. The inner end of the last-named arm of the lever is engaged by a helical tension spring 10 which is adapted to draw said end of said lever normally toward the axis of the drum thereby causing the other arm 9 thereof to be projected the maximum distance from said axis. The outer ends of the arms 9 of said levers 8 are similarly equipped with bearings for shafts 11 which are associated with the shafts 7 to accomplish the specific results hereinafter particularly set forth.

It will be obvious, of course, that the arms 6 and levers 8 are arranged in pairs, the arms of each pair being disposed at opposite ends of the drum 5, and said arms being slightly offset from each other circumferentially of the drum so as to cause the shafts 7 and 11 to extend at a slight angle to the axis of the drum and perpendicularly to the general direction of helical travel or helical pitch of travel of the film tape to be treated, and the carrier therefor.

Each of the shafts 7 and 11 is provided with a plurality of flanged rolls 12, all of which are rigid with said shafts, the latter being freely rotatable in the bearings in the outer ends of the arms 6 and 9. One of said shafts, indicated at 13, and journaled in bearings carried at the outer ends of upwardly projecting arms 14 is adapted to be driven and is provided with sprockets 15 in place of the smooth surfaced rolls 12, said sprockets being adapted to engage the carrier for film tape to which the latter is attached, said carrier being of any desired and suitable construction.

The drum 5 is preferably hollow and is equipped with an annular chamber 16 adapted to contain water for a cooling fluid, suitable means being provided for effecting a constant circulation of said cooling fluid 18 therethrough, the latter being admitted to and drained from said chamber 16 by means of flexible hose connections of any well-known character connected with a source of supply and drain in a well-known manner, said flexible connections being omitted from illustration. The said drum 5 is provided with a central shaft 17 which engages at its ends in suspension members 18, each of which has a segmental bottom portion, the lower edge of which is concentric with the drum and with the bottom of the tank in which the same is to be received and is adapted to rest upon said bottom. The upper arm 19 of one of said suspension members 18 is provided with a bearing for shaft 13 and is secured at its upper end to a bar or other carrying member 20 which is engaged with suitable hoisting devices by means of which the drum 5 and all parts carried thereby may be lifted out of the tank 1 when desired. The said member 20 extends over the entire series of tanks 1—4 inclusive, and is adapted to carry all of the drums 5 in said several tanks for simultaneously raising and lowering the same without disturbing the mechanism for driving the shafts 13.

Associated with the shafts 7—11 and 13 of the several drums 5 are idle shafts 21 and 22 which are carried by the member 20 and which are equipped with idle rolls similar to the rolls 12 over which the film tape and its carrier is adapted to be trained for effecting passage of said carrier from the propelling mechanism of one drum 5 to the propelling mechanism of the next succeeding drum 5, and to effect the return of said carrier from the last drum of the series to the first drum thereof. Suspended idle rolls 23 are associated with the endmost shafts 21 and 22 for providing sufficient slack in said carrier to enable all of said drums 5 to be hoisted out of the tanks 1—4 inclusive without placing any strain upon or requiring the disengagement of the film tape and its carrier from any of the rolls over which it is normally trained.

By means of this arrangement the film tape to be treated is passed helically from end to end of each of the drums 5 successively through the liquids contained in the tanks 1—4 inclusive, the path of travel being polygonally and on a relatively large radius around the axes of the several drums.

It will be seen that the shaft 13 and the sprockets 15 associated herewith are disposed above the upper edges of the tank 1 so that in travel the film tape will become and remain exposed to view from the time that it leaves the level of the solution contained in such tank until it again becomes immersed therein, and that it will become so exposed during a part of each revolution about the axis of the drum, thus enabling the operator to observe carefully the effect of the solution on the film and particularly the effect of the developing solution adapted to be contained in the tank 1, this being obviously very important in order to prevent over or under-development of the film during the period of its travel through said solution from end to end of the drum 5 immersed therein. The drum 2 is adapted to contain a fixing solution and the drums 3 and 4 to contain water for washing the film so that it is thereafter ready to be dried and used.

The shaft 22 is journaled in bearings rigid with the tank 1 and is provided with rolls corresponding in number with the rolls carried by the several shafts of the drum 5 in the tank 1 so that the film tape may be trained from any one of the rolls thereon to the propelling mechanism associated with said drum 5 thereby causing the same to travel helically less than the maximum helical travel through the tank 1 thereby obviously regulating the time during which said film tape is subjected to the action of the developing solution in said tank 1. Thus, for example, if a relatively strong developing solution is used the film tape may be fully developed in one-half or one-third the length of time required for the film tape to travel the full distance of which it is normally capable of traveling through said tank 1, but such film tape may travel an excessive length of time through a developing solution without injury thereto, and may similarly travel an excessive length of time through the wash water advantageously. Associated with each contiguous pair of rolls on the shaft 22 is one of said idle rolls or spools 23 which is suspended in the film carrier and serves to maintain the latter taut, as particularly illustrated in Fig. —11—. In the event that less than the full length of carrier is employed, as for example, in the event that only one-half or other fraction of the full number of sets of rolls and sprockets of the drum 5 in the tank 1 shall be used, then the requisite section or length of film not required may be suitably detached, and the end portions of the remainder secured together to render such carrier endless in a well-known manner. However, it is preferable to use the full length of carrier at all times and to attach the film tape thereto at that point in the travel of said carrier through the tank 1 which will expose the film tape to the action of the developing liquid in said tank the desired length of time.

The said members 20 from which the said drums 5 are suspended, carry bearings for vertical shafts, 24 and a horizontal shaft 25, said shafts being provided with intermeshing miter gears 26, and the shafts 24 and 13 being similarly provided with intermeshing miter gears 27 for driving all of said shafts 13 simultaneously at uniform speed thereby driving the carrier for the film tape at a plurality of points between its ends as will be obvious. The several shafts 7 may be also equipped with sprocket wheels for driving the same from the shafts 13, as more particularly illustrated in Fig. —5—, in which said several shafts corresponding to the shafts 7 are equipped with sprockets 28 over which and a driving sprocket on the shaft 13, a sprocket chain 29 is trained, and similarly some of the rolls on the shafts 7 may be sprockets instead of smooth rolls so as to more positively drive the film carrier 30 as shown in detail in Fig. —10—.

The said carrier consists preferably of a ribbon of a suitable material which is equipped with series of perforations 31 in which the sprocket teeth 32 of the sprocket rolls are adapted to engage for positively propelling said carrier. The latter is preferably of considerably greater width than the film tape 33 adapted to be carried thereby. The latter is adapted to rest upon the outer surface of said carrier preferably between the series of perforations 31 therein. In place of said ribbon 30 a sprocket chain may be employed, or any other suitable carrying means may be substituted therefor.

The said shaft 25 is adapted to be driven from an electric motor or other suitable source of power indicated at 34 by means of a gear 35 meshing with a gear 36 rotatably mounted on a shaft 37. Rigid with the gear 36 is a sprocket over which and a similar sprocket rotatably mounted on the shaft 25, a sprocket chain 38 is trained. Said shaft 25 is equipped with a non-rotatable slidable clutch member 39 which is adapted to be thrown into engagement with a clutch member rigid with the sprocket over which the chain 38 is trained for causing the shaft 25 to rotate with said sprocket. On the shaft 37 I have similarly provided a slidable non-rotatable clutch member 40 which is adapted to engage a clutch member 41 rigid with the shaft 37 for clutching the gear 36 rigid with said last-named shaft for rotating the latter. Said shaft is provided at intervals with drum 42 to which cables 43 are attached at one end, the same being attached at their other ends to the members 20, and being adapted when the gear 36 is clutched rigid with the shaft 37 to raise said member 20 and all of the drums 5 carried thereby. When the clutch 40 is thrown to the last-named position the clutch 39 should be thrown to release the sprocket on the shaft 25 to prevent travel of the film and its carrier. The hoisting mechanism is substantially diagrammatically illustrated, as it will be obvious that the said drums 5 will be comparatively heavy and must be slowly and carefully hoisted and lowered to prevent injury to the mechanism carried thereby.

As previously stated the time that the film tape is to be exposed to the action of the developing solution is primarily controlled by the number of its convolutions about the drum 1 but this may also be controlled, at least in part, by varying the speed of travel of said film tape. This is preferably accomplished by means of a variable speed motor the controlling lever of which is disposed contiguous to the tank 1 so that it may be easily operated by the person having charge of the treatment of the film tape. The aforesaid means for varying the speed of travel of the film and the equivalents thereof such as variable speed gearing, are too well known to require illustration and description herein and the same are, therefore, omitted.

I claim as my invention:

1. Film treating apparatus including an endless carrier for film-tape and means over which the same is trained, said means including a group of parallel shafts disposed substantially equi-distantly from a common axis and arranged to form a polygonal figure, each of said shafts being equipped with a series of rolls over which the said carrier is trained to cause the latter to travel substantially helically from end to end of the shafts of said group, at least one of said shafts geared to a source of power.

2. Film treating apparatus including an endless carrier for film-tape and means over which the same is trained, said means including a group of parallel shafts disposed substantially equi-distantly from a common axis and arranged to form a polygonal figure, each of said shafts being equipped with a series of rolls over which the said carrier is trained to cause the latter to travel substantially helically from end to end of the shafts of said group, at least one of said shafts geared to a source of power, said first-named means including mechanism for maintaining the carrier under uniform tension.

3. Film treating apparatus including an endless carrier for film-tape and means over which the same is trained, said means including a group of parallel shafts disposed substantially equi-distantly from a common axis and arranged to form a polygonal figure, each of said shafts being equipped with a series of rolls over which the said carrier is trained to cause the latter to travel substantially helically from end to end of the shafts of said group, at least one of said shafts geared to a source of power, at least one of the shafts of said group being laterally movable relatively to the remainder thereof, and means associated with said laterally movable shaft for holding the same yieldingly at the outer limit of its movement for maintaining the film tape carrier trained over all shafts of said group under uniform tension.

4. Film treating apparatus including an endless carrier for film-tape and means over which the same is trained, said means including a group of parallel shafts disposed substantially equi-distantly from a common axis and arranged to form a polygonal figure, each of said shafts being equipped with a series of rolls over which the said carrier is trained to cause the latter to travel substantially helically from end to end of the shafts of said group, at least one of said shafts geared to a source of power, said means over which the endless carrier is trained including mechanism for maintaining a constant tension on the carrier.

5. Film treating apparatus including an endless carrier for film-tape and means over which the same is trained, said means including a group of parallel shafts disposed substantially equi-distantly from a common axis and arranged to form a polygonal figure, each of said shafts being equipped with a series of rolls over which the said carrier is trained to cause the latter to travel substantially helically from end to end of the shafts of said group, at least one of said shafts geared to a source of power, said means over which the carrier is trained including mechanism for maintaining the carrier under tension, and means positively engaging said carrier to drive the same.

6. Film treating apparatus including an endless carrier for film-tape and means over which the same is trained, said means including a group of parallel shafts disposed substantially equi-distantly from a common axis and arranged to form a polygonal figure, each of said shafts being equipped with a series of rolls over which the said carrier is trained to cause the latter to travel substantially helically from end to end of the shafts of said group, at least one of said shafts geared to a source of power, said carrier being adapted for engagement with sprocket wheels and all driven rolls over which the same is trained equipped with sprocket teeth to engage said carrier, and means for imparting tension to said carrier for maintaining the same engaged with said sprocket-rolls.

7. Film treating apparatus including an endless carrier for film-tape and means over which the same is trained, said means including a group of parallel shafts disposed substantially equi-distantly from a common axis and arranged to form a polygonal figure, each of said shafts being equipped with a series of rolls over which the said carrier is trained to cause the latter to travel substantially helically from end to end of the shafts of said group, at least one of said shafts geared to a source of power, and all of said shafts disposed perpendicular to the direction of travel of the film tape trained over the rollers carried thereby.

8. Film treating apparatus including an endless carrier for film-tape and means over which the same is trained, said means including a group of parallel shafts disposed substantially equi-distantly from a common axis and arranged to form a polygonal figure, each of said shafts being equipped with a series of rolls over which the said carrier is trained to cause the latter to travel substantially helically from end to end of the shafts of said group, at least one of said shafts geared to a source of power, a pair of frames carrying bearings in which the end portions of said shafts of said group are journaled, and a central connecting member for said frames rigid therewith, said shafts disposed relatively to the aforesaid common axis so that each point in any one of said shafts is equi-distant therefrom and the plane of the axis of such shaft intersecting the said common axis will be angularly disposed relatively to the latter.

9. Film treating apparatus including a supporting frame equipped with bearings, a group of parallel shafts journaled in said bearings and each equipped with a series of flanged rolls, a carrier for film-tape trained successively over the rolls of said shafts to travel in a substantially polygonal path and helically longitudinally of said group of shafts, at least one of said shafts geared to a source of power and the rolls of said shaft and the said carrier provided with inter-engaging formations to positively drive said carrier, at least one shaft of said group being idle and movable laterally relatively to the remainder thereof, and means associated with said idle shaft for yieldingly forcing the same toward the outer limit of its movement and against the convolutions of said carrier for maintaining the latter under tension.

In testimony whereof I have signed my name in presence of two subscribing witnesses.

FREDRICK B. THOMPSON.

Witnesses:
R. W. Lotz,
M. M. Boyle.